United States Patent [19]

Groth et al.

[11] Patent Number: 5,371,180

[45] Date of Patent: Dec. 6, 1994

[54] PROCESS FOR THE PREPARATION OF POLYSUCCINIMIDE AND POLYASPARTIC ACID

[75] Inventors: Torsten Groth; Winfried Joentgen, both of Cologne; Günter Boehmke, Leverkusen; Gerd Schmitz, Leverkusen; Hans-Joachim Traenckner, Leverkusen, all of Germany

[73] Assignee: Bayer AG, Leverkusen, Germany

[21] Appl. No.: 221,253

[22] Filed: Mar. 31, 1994

[30] Foreign Application Priority Data

Jul. 6, 1993 [DE] Germany ............... 4322410

[51] Int. Cl.$^5$ ............................. C08G 69/00
[52] U.S. Cl. .................... 528/363; 525/418; 525/419; 525/420; 528/328
[58] Field of Search ............ 528/363, 328; 525/418, 525/419, 420

[56] References Cited

U.S. PATENT DOCUMENTS

| | | | |
|---|---|---|---|
| 3,623,985 | 11/1971 | Hendrickson | 252/51.5 A |
| 3,846,380 | 11/1974 | Fujimoto et al. | 260/78 A |
| 4,590,260 | 5/1986 | Harada et al. | 528/328 |
| 4,696,981 | 9/1987 | Harada et al. | 525/328.2 |
| 4,839,461 | 6/1989 | Boehmke | 528/363 |
| 5,219,952 | 6/1993 | Koskan et al. | 525/419 |
| 5,288,783 | 2/1994 | Wood | 525/418 |
| 5,296,578 | 3/1994 | Koskan et al. | 528/363 |

FOREIGN PATENT DOCUMENTS 0578448 1/1994 European Pat. Off. .

OTHER PUBLICATIONS

Dessaignes, The Quarterly Journal of The Chemical Society of London, vol. III, pp. 187 and 188, (1851), Translation of Compt. Rend XXX, 324.

Dessaignes, Compt. Rend. XXXI, pp. 432 and 433 (1850).

Kovacs et al., J. Org. Chem. vol. 26, pp. 1084–1091 (1961).

Harada, J. Org. Chem. vol. 24, pp. 1662–1666 (1959).

Primary Examiner—Morton Foelak
Assistant Examiner—Shelley A. Dodson
Attorney, Agent, or Firm—Connolly and Hutz

[57] ABSTRACT

Polysuccinimide is prepared by reaction of fumaric acid, maleic acid or a derivative thereof with urea, isourea, carbamic acid, ammonium carbamide, ammonium bicarbonate, diammonium carbonate or mixtures of the abovementioned substances in a reactor at temperatures of preferably 100° C. to 300° C. over reaction times of preferably 0.5 minute to 300 minutes.

5 Claims, No Drawings

PROCESS FOR THE PREPARATION OF POLYSUCCINIMIDE AND POLYASPARTIC ACID

BACKGROUND OF THE INVENTION

The invention relates to a process for the preparation of polysuccinimide (PSI) and polyaspartic acid (PAA).

The preparation and use of polyaspartic acid and its derivatives has for a long time been the subject matter of numerous publications and patents. The preparation can thus be carried out by thermal polycondensation of aspartic acid (J. Org. Chem. 26, (1961) 1084).

US-A 4 839 461 (=EP-A 0 256 366) describes the preparation of polyaspartic acid from maleic anhydride, water and ammonia. Maleic anhydride is converted into the monoammonium salt in an aqueous medium with the addition of concentrated ammonia solution. The monoammonium salt is polymerized to polysuccinimide in the melt especially at temperatures of 125° to 140° C. and the polysuccinimide is converted into PAA or a salt thereof by hydrolysis. This procedure may pass through viscous phases which are difficult to control industrially. WO 93/23452 refers to the production of polyaspartic acid from maleic anhydride, water and ammonia too.

It is known from US-A 4 590 260 (=JP-A 1984(59)-60160) to subject amino acids to a polycondensation together with derivatives of malic, maleic and/or fumaric acid at 100° to 225° C. According to US-A 4 696 981, microwaves are employed in such reactions.

DE-A 2 253 190 (=US-A 3 846 380) describes a process for the preparation of polyaminoacid derivatives, specifically polyaspartic acid derivatives. According to this process, in addition to aspartic acid, maleic acid derivatives (the monoammonium salt and monoamide) are also used, by thermal polymerization, for the preparation of the intermediate stage of polysuccinimide, which in turn can be reacted with amines in suitable solvents to give the desired derivatives.

According to EP-A 256 366 (US-A-4 839 461), polyaspartic acid can be employed for removal of encrustations caused by hardness-forming agents in water (scale inhibition and scale deposition removal). According to US-A-5 116 513 and EP-A-454 126, polyaspartic acid and salts thereof are active constituents of detergents and fertilizers.

The invention relates to an improved process for the preparation of polysuccinimide and polyaspartic acid by reaction of fumaric acid, maleic acid or a derivative thereof with urea, isourea, carbamic acid, ammonium carbamide, ammonium bicarbonate, diammonium carbonate and mixtures of the abovementioned substances in a reactor at temperatures of preferably 100° C. to 300° C. over reaction times of preferably 0.5 minutes to 300 minutes, the resulting polysuccinimide being converted, if appropriate, into polyaspartic acid or salts thereof by hydrolysis.

A preferred variant comprises mixing maleic anhydride or maleic acid with one of the nitrogen-containing carbonic acid derivatives described above and a metal carbonate or metal bicarbonate and subjecting this mixture to discontinuous or continuous thermal polymerization at preferably 100° C. to 300° C. over reaction times of preferably 0.5-300 minutes in a suitable reactor, if appropriate in the presence of a solvent.

Polyaspartic acid in the present invention is understood as meaning both the free polyaspartic acid and its salts.

In a preferred embodiment, the polyaspartic acid prepared according to the invention essentially comprises recurring units of the following structure:

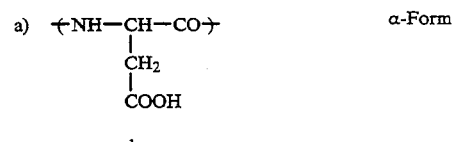

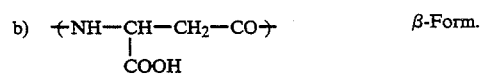

The chemical structure is preferably analyzed by $^{13}$C-NMR and, after total hydrolysis, by HPLC, GC and GC/MS.

In addition to the polyimide, the abovementioned recurring units a) and b) can also be present in the product obtained directly during the polymerization.

In addition, by a suitable reaction procedure and choice of starting materials, the product can comprise further recurring units, for example Malic acid units of the formula

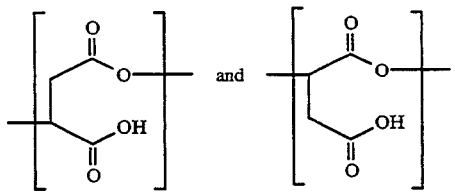

and maleic acid and fumaric acid units of the formula

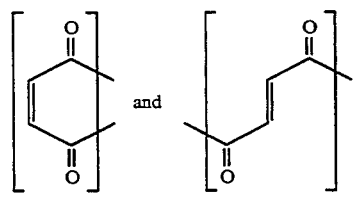

If, in addition to the maleic acid derivative and the abovementioned nitrogen-containing carbonic acid derivatives, metal carbonates or metal bicarbonates are employed as a third component, partly neutralized structures can also be present, in addition to the abovementioned structures. The amount of metal carbonate or metal bicarbonate here is chosen such that 10% to 90% of the carboxyl groups possible in the polymer are neutralized. All metal carbonates or bicarbonates which are stable under normal conditions can be used. However, the bicarbonates or carbonates of the alkali metals and alkaline earth metals are preferably to be employed. Particularly preferred cations are Li, Na, K, Mg, Ca and Ba. The partly neutralized polyaspartic acid derivatives show a significantly improved solubility in water compared with pure polysuccinimide. In addition to recurring succinimide units, they contain the abovementioned units a) and b), which can be present in salt form.

The maleic acid derivatives to be employed according to the invention, such as maleic anhydride or maleic acid, are reacted with the nitrogen-containing carbonic acid derivatives according to the invention, such as urea, isourea, carbamic acid, ammonium carbamide, ammonium bicarbonate, diammonium carbonate and mixtures thereof, such that the molar ratio of nitrogen to maleic acid derivatives is between 0.5 and 2, preferably between 0.8 and 1.2 and particularly preferably between 0.95 and 1.05.

The starting material mixtures required for the polymerization can be prepared in a separate process. Thus, the mixing operation can be carried out in bulk in a suitable reactor, such as, for example, a paddle drier. However, the mixing can also be carried out in a suitable solvent, such as, for example, water. The mixing step and polymerization step can also be realized in one reactor, however, by simultaneous metering in of the mixture components. The polymerization step can be carried out discontinuously or continuously in suitable reactors. Reactors to be employed discontinuously are, for example, kneading machines or paddle driers.

All high-viscosity reactors which allow removal of the water vapor released, preferably those having large reaction volumes, and preferably also those having kinematic self-cleaning of the surfaces which come into contact with the product and likewise preferably those with shaft heating, can be employed. Machines of corrosion-resistant material, for example stainless steel, are preferably employed for corrosion resistance reasons.

For example, a screw machine of the "Selfcleaner" type from Lurgi can be employed.

The "Selfcleaner" is a continuously self-cleaning screw machine with screws which rotate in the same direction and with hollow shafts through which a heat transfer medium flows for temperature control. The product to be treated is constantly conveyed by the rotating hollow screws through the trough of the apparatus. Above the screw shaft is a gas space for removing the vapors.

The liquid heat transfer medium flows first through the hollow shafts, subsequently enters the last hollow flight close to the product discharge and flows through the hollow flights in countercurrent with the product transported in the trough. The water vapor formed is removed in the product direction.

The hollow screws in the "Selfcleaner" have a self-cleaning circular profile, so that one screw constantly cleans the other. The thread of one hollow screw projects completely, apart from a certain tolerance, into the thread gap up to the hollow shaft of the other screw. The hollow shafts are welded from profiled sheets and as a rule are not finished mechanically.

Products which are difficult to treat and which, under heat treatment, tend to stick and above all to form a crust on the heating surfaces are preferably processed in the "Selfcleaner". The product is transported in the thread gap of the two hollow screws in the form of an open figure-of-eight. The product is mixed in the region of engagement of the hollow screws by the relative speed of the hollow screws.

Other large-volume high-viscosity reactors can also be employed according to the invention, for example of the "AP-Conti" type from List and screw heat exchangers, and polymer screws likewise can also be employed according to the invention. Other types of reactor to be employed according to the invention are the belt reactor (belt dryer) or roller dryer.

The polymerization temperatures are between 100° C. and 300° C., preferably 140° C. to 250° C., particularly preferably 160° C. to 220° C.

The starting material mixtures have a residence time of 0.5 to 300 minutes, preferably 1 to 60 minutes, particularly preferably 2 to 20 minutes, in the reactors described above. The polymerization products are converted into the corresponding polyaspartic acid salt by dissolving in a base at 20° to 95° C., preferably 40° to 70° C., particularly preferably 50° to 70° C. It is also possible for the free polyaspartic acid to be obtained even at this point by hydrolysis in water at 80°–100° C. or by treatment of the salt with acids or acid ion exchangers. The product is obtained as a fine powder by spray drying.

The polymer prepared has different chain lengths and molecular weights, according to analysis by gel permeation chromatography, depending on the reaction conditions, for example the residence time and temperature of the thermal polymerization. ($M_w$=500 to 10,000, preferably 1,000 to 5,000, particularly preferably 2,000 to 4,000). In general, the content of the $\beta$-form in the polyaspartic acid prepared according to the invention is more than 50%, in particular more than 70%.

The compounds according to the invention are used in particular as a dispersing agent, detergent additive, sequestering agent, scale inhibitor, corrosion inhibitor, above all for brass, and as a microbicide.

EXAMPLES

The polymerization reactions were carried out in a high-viscosity reactor of the Lurgi selfcleaner type from Lurgi. The "Selfcleaner" is a continuously self-cleaning screw machine with screws which rotate in the same direction and with hollow shafts. A heat transfer medium flows through both the hollow shaft and the housing jacket for temperature control. The temperature program is as follows: the liquid heat transfer medium flows first through the hollow shafts, subsequently enters the last hollow flight close to the product discharge and flows through the flights in countercurrent with the product transported in the trough. The apparatus has several gas removal heads, which can be opened and closed as required. With the aid of the zones, any desired water or water vapor content can be established in the reaction mixture. The hollow screws of the "Selfcleaner" have a self-cleaning circular profile. The thread of one hollow screw projects completely, apart from a certain dimension of play, into the thread gap of the other screw. The tolerance between the two hollow shafts on the one hand and between the hollow shafts and the trough on the other hand is about 3 mm. The apparatus used has the following dimensions:

L=900 mm, $\phi$=100 mm

Example 1

Preparation of polysuccinimide from maleic anhydride and ammonium carbonate 9 800 g of maleic anhydride (100.0 mol) and 4 800 g (50.0 mol) of ammonium carbonate were intimately mixed in a paddle drier and then introduced continuously into the mixing part of the screw, which was heated at 172° C. to 174° C., at a metering rate of 5 kg/h via a conveying screw. A thin film of melt was immediately formed in the mixing zone on the hot surface of the screw shafts and polymerized, the water of reaction escaping. As the screw progressed, the polymer was dried completely and left the screw as a coarse-grain to pulverulent mass. The residence time on the screw was 5 minutes. 9 500 g of product which is characterized by the following analyses were obtained. (Table I)

Example 2

Preparation of polysuccinimide from maleic anhydride and ammonium carbonate (simultaneous metering)

The experiment described in Example 1 was repeated, with the difference that the maleic anhydride and ammonium carbonate are introduced simultaneously in the stoichiometric ratio into the mixing part of the screw via a special metering device. The metering rates of the individual components were chosen such that a metering rate for the mixture of 5 kg/h again resulted. The other conditions were left as in Example 1. About 3 270 g of product which had the following analytical data (Table I) were discharged from the screw per hour.

Example 3

Preparation of polysuccinimide from an aqueous maleic acid/urea mixture 6 500 g of water are added to 9 800 g of maleic anhydride (100 mol) at 75° C. in the course of one hour. 3 300 g of urea (55 mol) are then added and the mixture is subsequently stirred for a further 30 minutes. This mixture forms a homogeneous solution at 70° C., and the solution is fed to the screw, which has been heated to 170° C., at a metering rate of 5 kg/h. The product temperature under these conditions is 162° C. to 165° C. The readily volatile contents formed during the reaction are removed via a gas removal head with a downstream condenser. The water which has been separated off also has small contents of maleic acid and fumaric acid and is recycled to the process as the solvent. In this experiment, about 2500 g of product in the form of a pale pink-colored coarse powder are obtained per hour (Analysis: see Table I)

Example 4

Preparation of a partly neutralized polyaspartic acid 11 600 g of maleic acid (100 mol), 3 300 g of urea (55 mol) and 1 550 g of sodium carbonate monohydrate (12.5 mol) are intimately mixed in a solids mixer at room temperature. The mixture is fed to the screw, which has been heated to 175° C., at a metering rate of 4 kg/h. The residence time is 10 minutes. 2 550 g of product are thus obtained per hour as a yellow-beige coarse powder. (Analysis: see Table I)

Characterization of the resulting products

To characterize the products, the acid number, elemental composition and molecular weight distribution were determined. Applications tests furthermore were carried out in respect of the sequestering and dispersing action of the product.

TABLE I

| Examples Elemental composition | | 1 | 2 | 3 | 4 |
|---|---|---|---|---|---|
| C | [% by weight] | 46.0 | 46.6 | 45.2 | 44.8 |
| H | [% by weight] | 3.8 | 3.6 | 4.2 | 3.1 |
| N | [% by weight] | 13.5 | 14.4 | 14.8 | 14.2 |
| NH$_4$ | [% by weight] | 1.0 | 0.8 | 0.7 | 1.2 |
| H$_2$O | [% by weight] | 0.3 | 0.3 | 0.4 | 0.2 |

TABLE I-continued

| Examples Elemental composition | 1 | 2 | 3 | 4 |
|---|---|---|---|---|
| Na [% by weight] | | | | 5.3 |
| Molecular weight distribution by GPC | | | | |
| M$_w$ | 3100 | 3050 | 3060 | 3080 |
| Acid number (mg(NaOH)/g) | 422 | 401 | 420 | 310 |

Preparation of polyaspartic acid Na salt

In each case 30 g=about 0.28 mol of the resulting polysuccinimide/polyaspartic acid mixture are suspended in about 50 ml of H$_2$O and dissolved at about 60° C. with a 50% strength sodium hydroxide solution up to a pH of 8.5. The solution is concentrated in vacuo and the resulting polyaspartic acid Na salt is dried completely. About 38 g are obtained.

Applications tests carried out after conversion into the Na salt:

a) Sequestering of a surfactant

Testing of the clouding intensity of an alkylbenzenesulfonic acid Na salt solution in tap water (total water hardness: 14 degrees German hardness)

1 ml of a 10% strength solution of a surfactant which is customary for detergents and is based on an alkylbenzenesulfonic acid (Marlon A 375) is made up to 100 ml with tap water with addition of 0.1 g of PAA Na salt. The resulting solution has a standing stability of more than three weeks. Without addition of PAA Na salt, the solution becomes cloudy within a few minutes.

b) Dispersing of zinc oxide 0.3 g of PAA Na salt are dispersed in 200 ml of tap water with 10 g of zinc oxide. The dispersion is transferred to a measuring cylinder. After three hours, samples are taken at various points in the measuring cylinder and analyzed for their zinc oxide content. It has been found here that the zinc oxide content is always the same due to the good dispersing action. Furthermore, the sedimentation stability was determined after 3 hours and 24 hours. In both cases, practically no sedimentation layer was found at the base of the measuring cylinder.

We claim:

1. A process for the preparation of polysuccinimide and the subsequent preparation of polyaspartic acid by reaction of fumaric acid, maleic acid or a derivative thereof with urea, isourea, carbamic acid, ammonium carbamide, ammonium bicarbonate, diammonium carbonate or a mixture of the abovementioned substances in a reactor, the resulting polysuccinimide being converted, if appropriate, into polyaspartic acid or a salt thereof by hydrolysis.

2. The process as claimed in claim 1, wherein a twin-shaft extruder which is self-cleaning and has hollow shafts through which a heat transfer medium flows for temperature control is used.

3. The process as claimed in claim 1, wherein the reaction of the maleic acid or the derivative thereof is carried out at 100° C. to 300° C.

4. The process as claimed in claim 1, wherein the maleic acid or a derivative thereof is mixed with urea, isourea, carbamic acid, ammonium carbamide, ammonium bicarbonate, diammonium carbonate or a mixture of the abovementioned substances and a metal carbonate or metal bicarbonate and this mixture is subjected to thermal polymerization at 100° to 300° C. over a reaction time of 0.5 to 300 minutes in a suitable reactor.

5. The process as claimed in claim 1, wherein the maleic acid derivative is maleic anhydride.

* * * * *